United States Patent Office 2,780,606
Patented Feb. 5, 1957

2,780,606

PROCESS FOR THE PREPARATION OF RUBBER AND PLASTIC MATERIALS OF CELLULAR STRUCTURE

Peter Hoppe, Troisdorf, Hans Pfeffer, Opladen, and Erwin Müller, Leverkusen-Bayerwerk, Germany, assignors to Farbenfabriken Bayer Aktiengesellschaft, Leverkusen, Germany, a corporation of Germany No Drawing. Application August 22, 1951, Serial No. 243,164

Claims priority, application Germany August 23, 1950

2 Claims. (Cl. 260—2.5)

The present invention relates to a process for the preparation of rubber and plastic materials of cellular structure.

The manufacture of cellular materials from organic, thermoplastic materials can be carried out by incorporating into the plastic material an organic blowing agent which decomposes with the generation of gas at temperatures which render the material plastic. As organic blowing agents there are used, for instance, aliphatic azo compounds, such as azo diisobutyrodinitrile, azo dicarboxylic acid derivatives or nitroso-urethane or -amides. With the exception of the azo diisobutyro dinitrile, which upon decomposition is converted into the toxic tetramethyl succinic acid dinitrile, the organic blowing agents impart a more or less disagreeable odor to the blown materials. This is true in particular of sulfur-containing compounds, such as for instance, benzene sulfonic acid hydrazide, as well as the oxalate of bis-(methyl-iminoamino)-disulfide, unless these compounds are worked up with carrier materials which adsorb or chemically combine with the sulfurous decomposition products. For instance, a mercaptane-like odor occurs when blowing polyvinyl chloride with the said sulfur compounds.

It has been found that oxalic acid together with compounds containing no sulfur, which contain in their molecule the amidine grouping

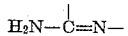

at least once, and which in aqueous solution have a pH-value of <8, are excellently suited as blowing agents, these compounds being preferably applied in equimolecular proportion. The agents can be used for the manufacture of shaped articles of porous or sponge-like structure from high-molecular, organic, natural or synthetic, thermoplastic or thermosetting substances or mixtures. Instead of mixtures of oxalic acid with the amidines of the above formula the oxalate obtained therefrom may very often be used to advantage.

Suitable amidine compounds containing no sulfur are such compounds which due to their weakly basic nature are capable of neutralizing the acid action of the oxalic acid used simultaneously without binding the carbon dioxide formed when the oxalic acid decomposes. It has been found that compounds having in aqueous solution a pH-value lower than 8 fulfil these requirements. Such compounds are, for instance, dicyandiamide, melamine and 1-guanyl-guanazole

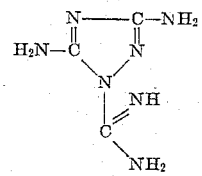

The production of blown articles by means of the new blowing agents is preferably carried out by incorporating the weakly basic compounds and oxalic acid, advantageously in equimolecular proportions, in the materials to be blown, either as such or in the form of their solutions, heating the mixture if necessary in suitable moulds and the like, to temperatures at which the materials become sufficiently plastic, and causing decomposition of the blowing agents with evolution of gas. Naturally the usual fillers, plasticizers, or additional blowing agents may be added. Especially suitable additional blowing agents are the nitroso-urethanes or nitrosocarbamides disclosed in copending application Serial No. 123,536, filed by Müller et al., now U. S. Patent No. 2,683,696. The mixing may be carried out on the usual mixing apparatus or on rollers, from about 3 to about 25 percent of blowing agent, calculated on the material to be blown, being preferably employed.

Instead of using the amidines and the oxalic acid separately, it may also be of advantage to prepare their oxalates and to incorporate these into the plastic material. The oxalates may be prepared in the known manner, in aqueous as well as in an organic medium, the latter medium being preferred if the oxalate tends to hydrolytical decomposition. The oxalates usually precipitate a very short time after the components have been mixed. They do not change on storing and decompose with strong generation of gas when heated in an indifferent solvent. Oxalic acid alone or its alkali salt cannot be employed as blowing agents within the temperature range required for the above mentioned thermoplastic materials.

Carrier substances for the manufacture of porous or sponge-like shaped articles are thermoplastic materials, such as polyvinylchloride, and copolymers of vinylchloride, for instance, with methacrylates, as well as chlorinated rubber, polystyrene or polyisobutylene, further thermosetting resins, such as phenolformaldehyde-condensation products and urea-formaldehyde-condensation products. Also rubber-like substances, such as natural rubber and polymers of butadiene or copolymers thereof with activated vinyl compounds may be mentioned. In these cases the process of the present invention is combined with vulcanisation. Further, mixtures of organic polyisocyanates, and polyfunctional, reactive compounds, e. g. polyesters containing hydroxyl groups. The selection of the amount and kind of fillers is of importance in these cases, since the mixture should be a moldable composition.

The blown materials obtained by means of our new blowing agents are distinguished by uniform pores and a low weight by volume. They have no disagreeable odor and do not change their color.

The invention is further illustrated by the following examples without being restricted thereto. The parts are by weight.

*Example 1*

12 parts of the oxalate of dicyandiamide are incorporated in a paste consisting of 50 parts of polyvinylchloride and 50 parts of tricresylphosphate in a mixing apparatus which is suitable for this purpose (for instance a one- or three-roller mill). When heating the mixture to 160–165° C. in a sealed mould under pressure and cooling it under pressure to room temperature, a light-weight cellular material of very fine pores is obtained having a specific gravity of between 0.2–0.25, and displaying no disagreeable odor. By immersing the cellular article in boiling water, the specific weight may be further reduced.

The oxalate of dicyandiamide is obtained by incorporating the dicyandiamide into a solution of 63 parts of oxalic acid in 300 parts of acetone at room temperature, the temperature being kept below 40° C. After 4 hours the oxalate of dicyandiamide which has precipitated is filtered off.

*Example 2*

12 parts of an equimolecular mixture of oxalic acid and dicyandiamide are mixed with a paste of 50 parts of polyvinylchloride and 50 parts of tricresyl-phosphate. The mixture is heated under high pressure in a tightly sealed mould to 160–165° C., and cooled to room temperature while maintaining the pressure. In this manner a cellular material of polyvinylchloride of very fine pores is obtained, having a weight by volume of 0.2–0.25 which varies according to the temperature used during working up and depends on the quantity of blowing agent added. The cellular material thus obtained has no disagreeable odor.

*Example 3*

A paste of 50 parts of polyvinylchloride and 50 parts of tricresylphosphate is treated with 10 parts of a mixture of equimolecular amounts of oxalic acid and 1-guanyl-guanazole. The paste mixed with the blowing agent is heated to 160–165° C. in a tightly sealed mould under high pressure, and cooled under pressure. A cellular material having very fine pores is obtained with a specific gravity of about 0.2, which has no disagreeable odor.

*Example 4*

3 parts of the oxalate of dicyandiamide are incorporated in a mixture having the following composition:

100.0 parts of pale rubber crepe
10.0 parts of zinc oxide
3.5 parts of sulfur
1.5 parts of dibenzothiazyldisulfide
80.0 parts of whiting
18.0 parts of mineral oil
3.0 parts of stearic acid The mixture is heated under pressure to 150° C. for 35 minutes. A moss rubber like material of very fine pores is obtained which shows no discoloration. The volume increase amounts to 500 percent.

*Example 5*

100 parts of a water-soluble resin obtained by condensation of phenol and formaldehyde with lime as a catalyst are thoroughly mixed on a mixing apparatus with 12 parts of the oxalate of dicyandiamide, and heated to a temperature of 140–160° C. A foam of very fine pores having a low specific weight is obtained, which has no disagreeable odor.

*Example 6*

100 parts of polystyrene are finely ground and thoroughly mixed in a ball mill with 12 parts of the oxalate of dicyandiamide, then pressed for 10 minutes under the press at 160° C. at a specific pressure of 200 kg./cm.$^2$, and cooled down to 30–40° C. The moulded article thus obtained is then blown in the warming cabinet at a temperature of 150° C. A light-weight cellular material is obtained, which has no disagreeable odor.

*Example 7*

100 parts of the polyester obtained from 3.2 mol trimethylolpropane, 0.5 mol phthalic acid and 2.5 mol adipic acid, said polyester having an acid number of 30, and a hydroxyl content of 5.62, are heated to about 80° C. and mixed with 10 parts of the oxalate of dicyandiamide. The blowing agent does not decompose at this temperature within a period of 3½ hours. By adding 65 parts of toluylenediisocyanate to the mixture consisting of polyester and blowing agent, a cross-linking reaction is started with splitting off of $CO_2$ from the carboxyl groups of polyester and with an additional generation of gas from the blowing agent.

In this manner a light-weight cellular material is obtained which has a weight by volume of 31 kg./m.$^3$ and a compressive strength of 1.1 kg./cm.$^3$.

If the same experiment is carried out without the oxalate, a light-weight cellular material is obtained having a weight by volume of 120–130 kg./m.$^3$.

*Example 8*

15 parts of a mixture consisting of equal parts of tetramethylene-dinitroso dimethylurethane and dicyandiamide oxalate are incorporated in a paste consisting of 50 parts by weight of polyvinyl chloride and 50 parts of tricresyl phosphate and intimately mixed therewith by milling. The mixture is heated in a closed mould to 160–165° C. under pressure and left to cool to room temperature under pressure. A cellular material is obtained which is completely odorless, does not discolor upon storing in sunlight and which does not shrink. The specific weight amounts to 0.15–0.2. By heating the material to 100–120° C. the specific weight may be further reduced.

*Example 9*

15 parts by weight of a mixture consisting of tetramethylene dinitroso-dimethylurethane and 5 parts of a mixture of an equimolecular proportion of dicyandiamide and oxalic acid are incorporated in the polyvinyl chloride of Example 8, and heated in the manner described above. An extremely porous cellular material having a specific weight of 0.12 is obtained, which does not discolor in sunlight and does not shrink even after storing for months.

*Example 10*

20 parts of a mixture consisting of 15 parts of a mixture of an equimolecular proportion of dicyandiamide and oxalic acid and 5 parts of tetramethylene-dinitroso dimethylurethane incorporated in the polyvinyl chloride of Example 8 and heated in the usual manner yield a cellular material, which does not tend to shrink after months of storing.

We claim:

1. In the process for the preparation of plastic materials of cellular structure, by contacting with a heat-decomposable substance, a mixture of a polyester and a polyisocyanate, the improvement which comprises employing as the heat decomposable substance a material selected from the group consisting of (1) mixtures and (2) salts of oxalic acid with dicyandiamide said oxalic acid and dicyandiamide being present in equimolecular quantities in an amount of about 3–25% based upon said plastic material.

2. In the process for the preparation of plastic materials of cellular structure, by contacting with a heat-decomposable substance, a mixture of a polyester and a polyisocyanate, the improvement which comprises employing as the heat decomposable substance a mixture of about equimolecular proportions of oxalic acid and dicyandiamide in an amount of about 3–25% based upon said plastic material.

References Cited in the file of this patent

UNITED STATES PATENTS

| | | |
|---|---|---|
| 2,195,623 | Harman | Apr. 2, 1940 |
| 2,409,883 | Migrdichian | Oct. 22, 1946 |
| 2,491,709 | Briggs et al. | Dec. 20, 1949 |
| 2,613,189 | Sarbach | Oct. 7, 1952 |
| 2,634,243 | Glenn | Apr. 7, 1953 |

FOREIGN PATENTS

| | | |
|---|---|---|
| 314,358 | Great Britain | June 24, 1929 |
| 650,336 | Great Britain | Feb. 21, 1951 |

OTHER REFERENCES

Handbook of Chemistry, Lange, sixth edition, 1946 (pages 440–441).